United States Patent [19]

Jiminez

[11] Patent Number: 4,562,820

[45] Date of Patent: Jan. 7, 1986

[54] CAVITATION-PRODUCING CARBURATION APPARATUS AND METHOD

[76] Inventor: Miguel A. Jiminez, 419 Sixth St., Douglas, Ariz. 85607

[21] Appl. No.: 588,910

[22] Filed: Mar. 12, 1984

[51] Int. Cl.$^4$ ............................................. F02M 31/00
[52] U.S. Cl. ..................................... 123/557; 123/514; 123/516; 123/522
[58] Field of Search ............... 123/557, 522, 523, 524, 123/514, 516

[56] References Cited

U.S. PATENT DOCUMENTS

| | | | |
|---|---|---|---|
| 2,742,886 | 4/1956 | McPherson | 123/522 |
| 4,106,457 | 8/1978 | Totten | 123/523 |
| 4,187,813 | 2/1980 | Stumpp | 123/557 |
| 4,349,002 | 9/1982 | Allen | 123/523 |
| 4,370,970 | 2/1983 | Kunz | 123/523 |
| 4,397,286 | 8/1983 | Jackson | 123/523 |
| 4,432,329 | 2/1984 | Redélé | 123/516 |
| 4,440,138 | 4/1984 | Smith | 123/516 |
| 4,454,851 | 6/1984 | Bourbonnaud | 123/514 |

Primary Examiner—Ronald H. Lazarus
Attorney, Agent, or Firm—Cahill, Sutton & Thomas

[57] ABSTRACT

An apparatus for vaporizing liquid gasoline for use in a carburation system includes a centrifugal pump which pumps liquid gasoline from a tank through a check valve into an inlet of the pump. The rotor of the centrifugal pump is operated at a sufficiently high rate to cause a substantial amount of cavitation of liquid gasoline within the centrifugal pump. The liquid gasoline is preheated by exhaust heat from the engine before it enters the inlet from the centrifugal pump, and vaporizes rapidly in the cavitation region. The vaporized gasoline and some liquid gasoline are fed back into the tank, wherein the liquid portion recombines with gasoline already in the tank and the gasoline vapor accumulates above the liquid gasoline in the tank. Gasoline vapors are conducted from within the tank through a check valve into a carburation apparatus which mixes the gasoline vapors with a controlled amount of air and feeds it into the intake manifold of the engine.

16 Claims, 2 Drawing Figures

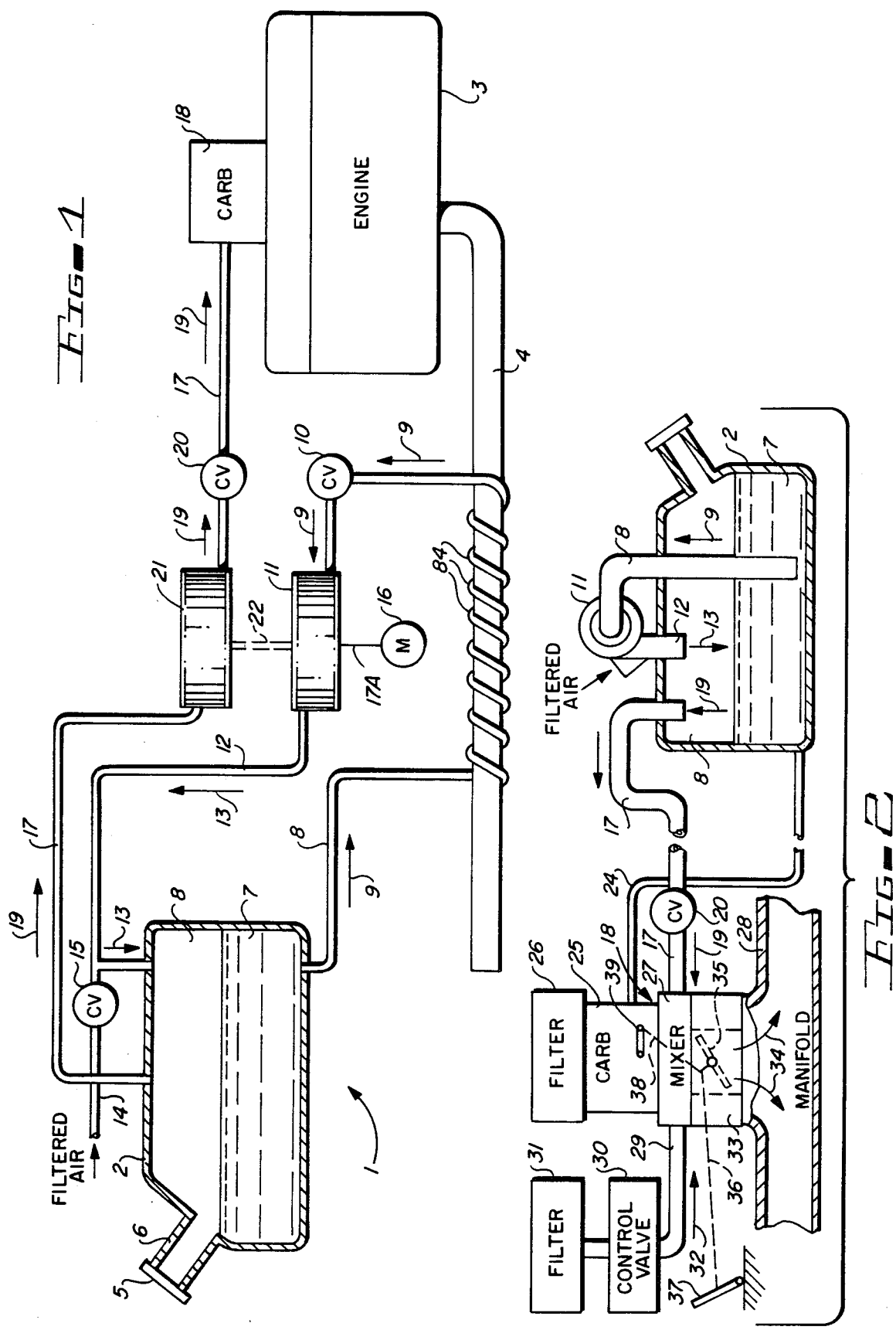

4,562,820

CAVITATION-PRODUCING CARBURATION APPARATUS AND METHOD

BACKGROUND OF THE INVENTION

The invention relates to methods and apparatus for efficiently vaporizing gasoline, and more particularly to devices and methods for vaporizing gasoline using cavitation produced by a pump.

It is well known that most automotive carburation systems convert liquid gasoline to gasoline vapor by atomizing or breaking up the liquid gasoline into very small droplets, increasing the surface area thereof, and greatly increasing the rate of evaporation. However, the vaporization of the liquid gasoline is incomplete usually by the time the mixture of air, gasoline vapor and liquid droplets are ignited in the combustion chamber of an engine. It has also been well known for years that the fuel efficiency of an engine can be increased by increasing the amount of vaporization that occurs. Previous techniques for converting gasoline vapor, include heating the gasoline by various techniques, bubbling air through the gasoline, and various techniques for breaking of the fuel into a fine mist of droplets. The state of the art is generally believed to be indicated by U.S. Pat. Nos. 4,386,593; 3,630,698; 3,942,499; 3,447,514; 3,221,198; 4,270,506; 4,076,002; 3,713,429; 2,461,411; 1,403,848; 1,530,882; 2,598,445; 1,792,239; 3,792,688; 3,800,768; and 3,395,681.

There remains an unfilled need for proving a reliable effective technique for increasing the efficiency of vaporization of liquid gasoline before it is injected into a carburation system.

Accordingly, it is an object of the invention to provide an improved apparatus and method for vaporizing liquid gasoline for use in a carburation system, which apparatus and method are operable under the normal range of circumstances in which the engine must operate.

It is another object of the invention to provide a device which readily produces an adequate supply of fully vaporized gasoline to an inlet of a carburation system.

It is another object of the invention to provide an improved apparatus and method for completely vaporizing liquid gasoline in a fashion that is safe, practical and efficient.

It is another object of the invention to provide an improved, highly efficient apparatus and method for completely vaporizing liquid gasoline which substantially increases the fuel economy of an automobile.

It is another object of the invention to provide an inexpensive apparastus for completely vaporizing liquid gasoline for use in an anuaotive carburation system, which apparatus is readily retrofittable to an automobile engine having a conventional carburation system.

It is another object of the invention to provide an apparatus and technique for efficiently vaporizing liquid gasoline to reduce the level of pollutants emitted by an internal combustion engine.

SUMMARY OF THE INVENTION

Briefly described and in accordance with one embodiment thereof, the invention provides an apparatus and method for completely vaporizing liquid gasoline by subjecting portions of the liquid gasoline to sufficiently high acceleration to cause cavitation in portions of the liquid gasoline and cause a substantial amount of the liquid gasoline to be vaporized in the cavitating regions. In the described embodiment of the invention, liquid gasoline is conducted from the bottom of a gasoline tank of an automobile, preheated using engine exhaust heat, passed through a check valve and into a high speed centrifugal pump. In the pump, the liquid gasoline is subjected to sufficiently high acceleration by the iimpeller of the pump to cause cavitation. The preheated gasoline rapidly vaporizes in the cavitating regions and is fed back into the upper portion of the gasoline tank, where the liquid gasoline not vaporized by the pump recombines with liquid gasoline remaining in the tank. A high density of gasoline vapor accumulates in the upper portion of the tank. During operation of the engine, an ample supply of vaporized gasoline from the upper portion of the tank is fed through a tube and a check valve therein to the inlet of a carburation system of the automobile. In one embodiment of the invention, this vaporized gasoline passes through a turbine, which produces some power that assists turning of the rotor of the cnetrifugal pump. In the described embodiment of the invention, a mixing chamber is included in the carburation apparatus, into which the gasoline vapor flows and is mixed with a controlled amount of air. The controlled amount of the mixture of gasoline vapor and air that is fed into the intake manifold of the engine and burned thereby is controlled by a butterfly valve. The butterfly valve is connected by a linkage to an accelerator pedal.

BRIEF DESCRIPTION OF THE DRAWINGS

FIG. 1 is a diagram of the centrifugal cavitation vaporizing system of the present invention.

FIG. 2 is another diagram useful in further explaining the operation of the system of FIG. 1 and also discloses another embodiment of the invention.

DESCRIPTION OF THE INVENTION

Referring now to FIG. 1, a presently preferred embodiment of the invention, designated by rerference numeral 1 will be described.

Gasoline tank 2 is the fuel tank of a typical automobile, and engine 3 is the gasoline engine of that automobile. Engine 3 has an exhaust pipe 4.

A cap 5 seals the fuel inlet 6 of gasoline tank 2. Gasoline tank 2 is only partially filled with liquid gasoline 7, so that there is a large empty region 8 above the surface of the liquid gasoline 7 in tank 2.

In accordance with the present invention, a fuel line or tube 8 communicates with the lower portion of tank 7, and cold, liquid gasoline moves through tube 8 in the direction of arrow 9. Preferably, tube 8 is composed of copper tubing. A typical size for the copper tubing would be one half inch in diameter. The cold, liquid gasoline flowing in tube 8 can be preheated while it is in tube 8, in accordance with one embodiment of the invention. If this is done, one way of preheating the fuel is to use the heat from exhaust pipe 4 by wrapping tube 8 around exhaust pipe 4, as indicated by reference numeal 8A. The number of turns of the tubing 8 around exhaust pipe 4 depends on how close to the exhaust manifold the turns are. The preheated liquid gasoline then flows through a check valve 10 before passing into an inlet of centrifugal pump 11. Check valve 10 can be any common check valve of the kind that can be purchased at most hardware stores.

Centrifugal pumps can be used, as long as their impellers are driven fast enough to cause cavitation. It has an internal rotor or impeller (not shown) which subjects the preheated gasoline to very high acceleration. This acceleration produces cavitation. Cavitation in pumps is ordinarily undesirable, as it leads to loss in pumping efficiency. However, in accordance with the present invention, the cavitation which is formed with the liquid gasoline undergoes a sufficient amount of acceleration to cause "voids" to form in the liquid. The near vacuum condition in these voids causes very rapid vaporization of the liquid gasoline, especially if it is preheated. More specifically, preheating of the gasoline increases the rate of vaporization of the liquid gasoline in these voids so that, in essence, it "boils" into them at a very rapid rate. Therefore, in accordance with the present invention, the cavitation process is an advantage, rather than a disadvantage, as is usually the case when cavitation occurs in a pump.

Not all of the liquid gasoline injected into centrifugal pump 11 is vaporized, however. A "foam" consisting of a large amount of vaporized gasoline and also a significant amount of liquid usually moves through tube 12 in the direction of arrows 13 and flows back into the upper empty region 8 of fuel tank 7. The liquid portion of the foam quickly recombines with the liquid gasoline 7 in the lower portion of tank 2, but the region 8 becomes filled with a large supply of vaporized gasoline, which is ideal for combustion in the pistons of engine 3 when mixed with an appropriate amount of fresh air.

In some instances, it is necessary for air to be drawn into the upper region 8 of tank 2 through tube 14, for example, to prevent a vacuum condition from occuring in tank region 8 under certain condition. A check valve 15 is provided to prevent any of the gasoline vapor foam in tube 12 from passing out through tube 14.

The impeller of the centrifugal pump 11 can be operated by an electric motor 16, mechanically connected to the impeller by a mechanical means designated by reference numeral 17A. The speed of motor 16 can be controlled to produce the desired level of cavitation in centrifugal pump 11.

Further in accordance with the present invention, a tube 17 leads from upper region 8 of the tank to a suitable carburation device 18 in the direction indicated by arrows 19. This vaporized gasoline moving through tube 17 passes through a one way check valve 20, which can be easily constructed or readily obtained at hardware stores. This check valve is needed to prevent possible ignition, for example, when the engine backfires, of the fumes in region 8 of tank 2. The details of carburation 18 are generally indicated in FIG. 2, subsequently described. As with any carburation devices, its main function is to mix a suitable amount of air with the vaporized gasoline to achieve complete and adequate combustion.

In accordance with one embodiment of the invention, a turbine device 21 is interposed in the path of vapor tube 17. Gasoline vapor will be sucked through tube 17 by the carburation device 18 as a result of vacuum created in the intake manifold of engine 3. A rotor of turbine 21 can be utilized to produce some or all of the power needed to either turn the impeller of centrifugal pump 11 or aid in turning it as indicated by mechanical connection 22.

More work needs to be done on the development of a practical and efficient carburation system, and I am conducting more experimentation in this area. However, in the past, I have devised an experimental carburation device that worked fairly well, as subsequently explained. The device was installed on a 1974 Ford Torino Sedan with a 400 cubic inch V8 inch, and excellent fuel economy was obtained for a system generally similar to the one shown in FIG. 2. Before further discussing the results of these experiments, it will be helpful to first describe the structure shown in FIG. 2.

In FIG. 2, reference numeral 2 again designates the gasoline tank of the vehicle. Reference numeral 11 again designates a centrifugal pump that was included in the device that I built. Liquid gasoline was drawn through inlet tube 8 in the direction of arrow 9. Cavitation was produced by the impeller of pump 11 within its housing, and gasoline foam, including a large amount of pure gasoline vapor, was fed back into the upper portion 8 of tank 2 through tube 12, as indicated by arrow 13. A vapor tube 17 in communication with the upper region 8 of gasoline tank 2 conducted gasoline vapor in the direction of arrows 19 through a one way check valve 20 to the carburation apparatus 18. Reference numeral 24 designates a conventional liquid fuel tank 2 running from the lower portion of gasoline tank 7 into the orignal equipment carburator system 25 of the automobile. Reference numeral 26 designates the conventional air filter of the automobile.

A mixing chamber device 27 was disposed between the intake opening of intake manifold 28. Mixing chamber 27 has an inlet to which tube 17 was connected, so that the gasoline vapor passes into the mixing chamber. An air inlet tube 29 is connected to another inlet of mixing chamber 27. A control valve 30 was connected in series communication with tube 29, and an auxilliary air filter 31 filtered air passing through tube 29 and control valve 30. Control valve 30 performed the function of adjusting the amount of air mixed with gasoline vapor entering mixing chamber via tube 17 in accordance with the operating condition of the engine. Reference numeral 32 indicates the controlled flow of air thorugh tube 29 into mixing chamber 27. Beneath mixing chamber 27 is a housing 33 which is open at its top and bottom to provide a path of flow of properly mixed gasoline vapor and air into the direction of arrows 34. A butterfly valve 35 was connected by a linkage 36 to the accelerator pedal 37 of the automobile. A further linkage 38 was connected to the throttle lever 39 of standard carburator 25.

During normal economy operation, the linkage 38 causes the throttle of carburator 25 to be completely closed, so essentially no air flows through air filter 26 and carburator 25 into the upper open end of mixing chamber 27. During normal "economy" operation, only gasoline vapor injected into mixing chamber 27 via tube 17 from the upper portion 8 of gasoline tank 2 is fed into the carburation system, and only air from filter 31 and control valve 30 is drawn into the mixing chamber 27 and mixed with the gasoline vapor. Maximum economy of operation occurs in this mode of operation. My experiments have shown that, at least for the embodiments of the invention that I have built so far, acceleration is quite poor. Therefore, the above-described mode of operation is suitable for fairly level highway driving. However, when more power is needed for acceleration or climbing a steep hill, the throttle linkages 36 and 38 cooperate to open the throttle of carburator 25 when accelerator pedal 37 is pushed more than half way to the floor. Then, liquid gasoline is drawn through line 24 into carburator 25 and supplemental air is drawn through filter 26, and a mixture of that air and partially vaporized gasoline is also conducted into the carburation system. This mixture of air and partially vaporized gasoline supplements that entering mixing chamber 27 thorough tubes 17 and 29, resulting in a temporary loss of economical operation, and a temporary increase of power.

My experiments indicate that the above-described system should result in at least a 100 percent increase in the fuel economy under driving conditions in which the throttle of the conventional carburetor remains closed. The amount of carbon monoxide produced in the exhaust is significantly reduced when only completely vaporized gasoline is mixed in the proper proportion with fresh air, and the engine operating temperature is reduced some. Although some thickening of the liquid gasoline in tank 2 occurs, since not all of the constituents of the liquid gasoline are vaporized at the same rate, this thickening does not occur, since during acceleation and high load driving conditions, liquid gasoline is also used by the conventional carburetor.

While the invention has been described with reference to a particular embodiment thereof, those skilled in the art will be able to provide various modifications to the above-described apparatus and method without departing from the true spirit and scope of the claims.

I claim:

1. In a carburation system for a liquid gasoline burning engine, a method of vaporizing liquid gasoline, said method comprising the steps of:
    (a) conducting liquid gasoline from a tank through a first tube into an inlet of a centrifugal pump;
    (b) causing the rotor of said centrifugal pump to rotate at a sufficiently high rate to cause cavitation of liquid gasoline flowing into said centrifugal pump through said inlet thereof, thereby causing a substantial quantity of the liquid gasoline in the cavitation regions to vaporize;
    (c) conducting said vaporized gasoline and some unvaporized gasoline from an outlet of said centrifugal pump through a second tube back into said tank, so that the returned liquid gasoline mixes with the rest of the liquid gasoline in the tank and the gasoline vapor accumulates in the region of the tank above the surface of the liquid gasoline therein;
    (d) conducting gasoline vapor in said region through a third tube to as carburation apparatus of said engine; and
    (e) causing said gasoline vapor to be introduced into and burned by said engine to operate it.

2. The method of claim 1 wherein step (a) includes conducting said liquid gasoline in said first tube through a first check valve.

3. The method of claim 2 wherein step (d) includes conducting said gasoline vapor in said tube through a second check valve connected in series with said third tube.

4. The method of claim 3 wherein step (d) includes conducting said gasoline vapor in said third tube through a turbine and using power generated by said turbine to assist powering of said centrifugal pump.

5. The method of claim 3 wherein step (e) includes conducting said gasoline vapor out of said third tube into a mixing chamber, conducting a predetermined amount of air through a control valve into said mixing chamber and mixing said air with said gasoline vapor therein and conducting the mixed air and gasoline vapor from said mixing chamber into an intake manifold of said engine.

6. The method of claim 3 including heating the liquid gasoline in said first tube before it reaches the inlet of said centrifugal pump.

7. The method of claim 6 including using heat from exhaust of said engine to perform said heating.

8. The method of claim 5 including also temporarily conducting atomized liquid gasoline and air from a conventional carburetor into said mixing chamber to boost the power of said engine.

9. A system for vaporizing liquid gasoline for fueling a gasoline burning engine comprising:
    (a) a centrifugal pump:
    (b) means for conducting liquid gasoline from a tank through a first tube into an inlet of said centrifugal pump;
    (c) means for causing the rotor of said centrifugal pump to rotate at a sufficiently high rate to cause cavitation of liquid gasoline flowing into said centrifugal pump through said inlet thereof, thereby causing a substantial quantity of the liquid gasoline in the cavitation regions to vaporize;
    (d) means for conducting said vaporized gasoline and some unvaporized gasoline from an outlet of said centrifugal pump through a second tube back into said tank, so that the returned liquid gasoline mixed with the rest of the liquid gasoline in the tank and the gasoline vapor accumulates in the region of the tank above the surface of the liquid gasoline therein;
    (e) means for conducting gasoline vapor in said region through a third tube to a carburation apparatus of said engine; and
    (f) means for causing said gasoline vapor to be introduced into and burned by said engine to operate it.

10. The system of claim 9 including a first check valve connected in series with said first tube.

11. The system of claim 10 including a second check valve to prevent possible ignition of vaporized gasoline in said tank by backfiring of said engine.

12. The system of claim 11 including a turbine and means for conducting said gasoline vapor in said third tube through said turbine and means for coupling power generated by said turbine to assist powering of said centrifugal pump.

13. The system of claim 11 including a mixing chamber and means for conducting said gasoline vapor out of said third tube into said mixing chamber, means for conducting a predetermined amount of air through a control valve into said mixing chamber, said mixing chamber mixing said air with said gasoline vapor therein and conducting the mixed air and gasoline vapor from said mixing chamber into an intake manifold of said engine.

14. The system of claim 11 including means for heating the liquid gasoline in said first tube before it reaches the inlet of said centrifugal pump.

15. The system of claim 14 including means for using heat from exhaust of said engine to perform said heating.

16. In a carburation system for a liquid gasoline burning engine, a method of vaporizing liquid gasoline, said method comprising the steps of:
    (a) conducting liquid gasoline from a tank through a first tube into an inlet of a cavitation producing means;

(b) causing said cavitation producing means to cause cavitation of liquid gasoline flowing into said cavitation producing means through said inlet thereof, thereby creating a substantial quantity of the liquid gasoline in the cavitation regions to vaporize;
(c) conducting said vaporized gasoline and some unvaporized gasoline from an outlet of said cavitation producing means through a second tube back into said tank, so that the returned liquid gasoline mixes with the rest of the liquid gasoline in the tank and the gasoline vapor accumlates in the region of the tank above the surface of the liquid gasoline therein;
(d) conducting gasoline vapor in said region through a third tube to as carburation apparatus of said engine; and
(e) causing said gasoline vapor to be introduced into and burned by said engine to operate it.

* * * * *

UNITED STATES PATENT AND TRADEMARK OFFICE
CERTIFICATE OF CORRECTION

PATENT NO. : 4,562,820
DATED : January 7, 1986
INVENTOR(S) : Miguel A. Jimenez

It is certified that error appears in the above-identified patent and that said Letters Patent are hereby corrected as shown below:

On the front page of the patent, the correct spelling of the inventor's name should be --Jimenez--.

Signed and Sealed this

Twenty-first Day of October, 1986

[SEAL]

*Attest:*

DONALD J. QUIGG

*Attesting Officer*     *Commissioner of Patents and Trademarks*